US008869162B2

(12) United States Patent
Baynast et al.

(10) Patent No.: US 8,869,162 B2
(45) Date of Patent: Oct. 21, 2014

(54) STREAM PROCESSING ON HETEROGENEOUS HARDWARE DEVICES

(75) Inventors: Alexandre de Baynast, Aachen (DE); Arsalan Ahmad, Aachen (DE); Andreas Steinmetzler, Aachen (DE); Thomas Santen, Aachen (DE); Satnam Singh, Cambridge (GB); Alain Gefflaut, Kirkland, WA (US); William Dunlap, Achen (DE)

(73) Assignee: Microsoft Corporation, Redmond, WA (US)

( * ) Notice: Subject to any disclaimer, the term of this patent is extended or adjusted under 35 U.S.C. 154(b) by 381 days.

(21) Appl. No.: 13/093,846

(22) Filed: Apr. 26, 2011

(65) Prior Publication Data

US 2012/0278811 A1    Nov. 1, 2012

(51) Int. Cl.
*G06F 9/46* (2006.01)
*G06F 9/50* (2006.01)

(52) U.S. Cl.
CPC .................................... *G06F 9/5027* (2013.01)
USPC ......................................................... 718/104

(58) Field of Classification Search
None
See application file for complete search history.

(56) References Cited

U.S. PATENT DOCUMENTS

| 7,174,194 | B2 * | 2/2007 | Chauvel et al. ................ 455/574 |
| 7,779,412 | B2 * | 8/2010 | Lin et al. ......................... 718/102 |
| 2001/0037399 | A1 * | 11/2001 | Eylon et al. .................... 709/231 |
| 2003/0041163 | A1 | 2/2003 | Rhoades et al. |
| 2003/0061269 | A1 * | 3/2003 | Hathaway et al. ............ 709/202 |
| 2008/0133891 | A1 | 6/2008 | Salz et al. |
| 2008/0250183 | A1 | 10/2008 | Bogin et al. |
| 2009/0320038 | A1 * | 12/2009 | Garbow et al. ................ 718/105 |
| 2010/0095300 | A1 * | 4/2010 | West et al. ..................... 718/104 |

OTHER PUBLICATIONS

Stokes, Jon, "PeakStream unveils multicore and CPU/GPU programming solution", Retrieved at <<http://arstechnica.com/hardware/news/2006/09/7763.ars>>, Sep. 18, 2006, pp. 3.
Dally, William J., "Imagine", Retrieved at <<http://cva.stanford.edu/projects/imagine/>>, Feb. 23, 2006, pp. 3.

(Continued)

*Primary Examiner* — Gregory A Kessler
(74) *Attorney, Agent, or Firm* — Steve Wight; Carole Boelitz; Micky Minhas

(57) ABSTRACT

A stream processing execution engine evaluates development-time performance characteristic estimates in combination with run-time parameters to schedule execution of stream processing software components in a stack of a stream processing application that satisfy a defined performance criterion in a heterogeneous hardware device. A stream processing application includes a stack of interdependent stream processing software components. A stream processing execution engine evaluates one or more performance characteristics of multiple computational resources in the heterogeneous hardware device. Each performance characteristic is associated with performance of a computational resource in executing a computational-resource-dependent instance of a stream processing software component. The stream processing execution engine schedules within the run-time environment a computational resource on which to execute a computational-resource-dependent instance of one of the stream processing software components. The computational-resource-dependent instance is targeted for execution on the computational resource that satisfies a performance policy attributed to the stream processing software component.

20 Claims, 6 Drawing Sheets

(56) References Cited

OTHER PUBLICATIONS

Serebrin, et al., "A Stream Processor Development Platform", Retrieved at <<http://ieeexplore.ieee.org/stamp/stamp.jsp?tp=&arnumber=1106786>>, In the Proceedings of the IEEE International Conference on Computer Design: VLSI in Computers and Processors, 2002, pp. 6.

"Streams features and architecture", Retrieved at <<http://publib.boulder.ibm.com/infocenter/streams/v1r2/index.jsp?topic=/com.ibm.swg.im.infosphere.streams.install-admin.doc/doc/ibminfospherestreams-introduction-overview.html>>, Retrieved Date: Feb. 17, 2011, p. 1.

Hubbe, et al., "An Innovative Tool for Measuring Video Streaming QoE", Retrieved at <<http://www2.alcatel-lucent.com/blogs/techzine/2011/an-innovative-tool-for-measuring-video-streaming-qoe/>>, Jan. 12, 2011, pp. 6.

"Map Reduce and Stream Processing", Retrieved at <<http://horicky.blogspot.com/2010/11/map-reduce-and-stream-processing.html>>, Nov. 5, 2010, pp. 6.

"NVIDIA® Tegra™ Multi-processor Architecture",—Retrieved at <<http://nifaq.pbworks.com/w/file/fetch/34408216/Tegra_Multi-processor_Architecture_white_paper.pdf>>, Feb. 2010, pp. 1-12.

"IBM Unveils Enterprise Stream Processing System", <<http://www.hpcwire.com/features/IBM_Unveils_Enterprise_Stream_Processing_System.html?viewAll=y>>, Retrieved Date: Feb. 17, 2011, pp. 11.

"Intel® 64 and IA-32 Architectures Software Developer's Manual", Retrieved at <<http://pdos.csail.mit.edu/6.858/2010/readings/ia32/ia32-1.pdf>>, Jun. 2009, pp. 500.

"Windows Phone Apps", Retrieved at <<http://www.microsoft.com/windowsphone/en-us/apps/default.aspx>>, Nov. 2010, pp. 2.

"NVIDIA Quadro vs. GeForce GPUs—Features and Benefits", Retrieved at <<http://en.wikipedia.org/wiki/Comparison_of_Nvidia_graphics_processing_units>>, Sep. 2009, pp. 60.

"ATI Stream Computing Compute Abstraction Layer (CAL)", Retrieved at http://developer.amd.com/gpu_assets/ATI_Stream_SDK_CAL_Programming_Guide_v2.0.pdf>>, Mar. 2010, pp. 108.

Mitola, J. III, "Software Radios: Survey, Critical Evaluation and Future Directions", Retrieved at <<http://ieeexplore.ieee.org/stamp/stamp.jsp?tp=&arnumber=210638>>, IEEE AES Systems Magazine, Apr. 1993, pp. 25-36.

Boyd, Chas, "Introduction to DirectCompute", Retrieved at <<http://code.msdn.microsoft.com/DirectComputeLecture/Release/ProjectReleases.aspx?ReleaseId=4519>>, Jul. 14, 2010 , pp. 38.

St-Laurent, Sebastien, "The Complete Effect and HLSL Guide", Retrieved at <<http://www.paradoxalpress.com/LayoutSamples/0976613212_sample.pdf>>, 2005, pp. 39.

"Developer Guide for NVIDIA Optimus Platforms", Retrieved at <<http://developer.download.nvidia.com/compute/cuda/3_2/toolkit/docs/CUDA_Developer_Guide_for_Optimus_Platforms.pdf>>, Mar. 30, 2010, pp. 11.

"An Introduction to Microsoft Accelerator v2", Retrieved at <<http://74.6.238.254/search/srpcache?ei=UTF-8&p=An+introduction+to+Microsoft+Accelerator+v2&fr=sfp&u=http://cc.bingj.com/cache.aspx?q=An+introduction+to+Microsoft+Accelerator+v2&d=4693991400737257&mkt=en-US&setlang=en-US&w=d7810559,f82d87c2&icp=1&.intl=us&sig=uomuPtWyok8py9CAtVDS6w-->>, Jun. 16, 2010, pp. 45.

"Microsoft Accelerator v2 Programming Guide", Retrieved at <<http://research.microsoft.com/en-us/projects/accelerator/accelerator_programmers_guide.docx>>, Jun. 16, 2010, pp. 66.

"MATLAB Documentation Center", Retrieved at <<http://www.mathworks.com/help/techdoc/>>, 2010, pp. 2.

"ATSC Digital Television Standard: Part 1—Digital Television System", Retrieved at <<http://www.atsc.org/cms/standards/a53/a_53-Part-1-2009.pdf>>, Aug. 7, 2009, pp. 1-24.

Baumann, et al., "The Multikernel: A New OS Architecture for Scalable Multicore Systems", Retrieved at <<http://research.microsoft.com/pubs/101903/paper.pdf>>, In the Proceedings of the ACM SIGOPS 22nd symposium on Operating systems principles, Oct. 11-14, 2009, pp. 1-15.

Kohler, et al., "The Click Modular Router", Retrieved at <<http://pdos.csail.mit.edu/papers/click:tocs00/paper.pdf>>, Aug. 2000, pp. 1-34.

Haessig, et al., "Case-study of a Xilinx System Generator Design Flow for Rapid Development of SDR Waveforms", Retrieved at <<http://webcache.googleusercontent.com/search?q=cache:4XoF67GoWccJ:www.mmitsforum.org/pages/sdr05/3.5%2520SW%2520Tools%2520and%2520Languages%25201/3.5-03%2520Haessig%2520et%2520al.pdf+CASE-STUDY+OF+A+XILINX+SYSTEM+GENERATOR+DESIGN+FLOW+FOR&hl=en&gl=uk">>, In the Proceeding of the SDR Technical Conference and Product Exposition, 2005, pp. 7.

Eker, et al., "A Matlab Toolbox for Real-time and Control Systems Co-design", Retrieved at <<http://www3.control.lth.se/user/johane/publications/RTSCA99.pdf>>, In the Proceedings of the Sixth International Conference on Real-Time Computing Systems and Applications, 1999, pp. 8.

"StreamIt Language Specification Version 2.1", Retrieved at <<http://groups.csail.mit.edu/cag/streamit/papers/streamit-lang-spec.pdf>>, Sep. 2006, pp. 1-20.

Hormati, et al., "Flextream: Adaptive Compilation of Streaming Applications for Heterogeneous Architectures", Retrieved at <<http://citeseerx.ist.psu.edu/viewdoc/download;jsessionid=1A61F78173CA4721A1B0C54AE08B7FAE?doi=10.1.1.159.7933&rep=rep1&type=pdf>>, In the Proceedings of the 18th International Conference on Parallel Architectures and Compilation Techniques, 2009, pp. 10.

Nightingale, et al., "Helios: Heterogeneous Multiprocessing with Satellite Kernels", Retrieved at <<http://research.microsoft.com/pubs/81154/helios.pdf>>, In the Proceedings of the ASM SIGOPS 22nd symposium on Operating systems principles, Oct. 11-14, 2009, pp. 14.

Adrian, Merv, "InfoSphere Streams is a Game Changer", Retrieved at <<http://itmarketstrategy.com/2009/05/22/infosphere-streams-is-a-game-changer>>, May 22, 2009, pp. 8.

Yang, et al., "Fei Teng 64 Stream Processing System: Architecture, Compiler, and Programming", Retrieved at <<http://ieeexplore.ieee.org/stamp/stamp.jsp?tp=&arnumber=4633351>>, IEEE Transactions on Parallel and Distributed Systems, vol. 20, No. 8, Aug. 2009, pp. 1142-1157.

Kapasi, et al., "Programmable Stream Processors", Retrieved at <<http://cva.stanford.edu/publications/2003/ieeecomputer_stream.pdf>>, Aug. 2003, pp. 54-62.

"CrestaTech", Retrieved at <<http://www.crestatech.com/pdf/ctv_product_brief.pdf>>, 2010, pp. 2.

Class, Gus, "DirectCompute GPU Optimization and Performance", Retrieved at << http://channel9.msdn.com/Blogs/gclassy/DirectCompute-Lecture-Series-210-GPU-Optimizations-and-Performance>>, Aug. 4, 2010, pp. 2.

"GPU-Z", Retrieved at <<http://www.techpowerup.com/gpuz/>>, Retrieved Date: Feb. 15, 2011, pp. 2.

Munshi, Aftab, "The OpenCL Specification," Khronos OpenCL Working Group, Sep. 2010, Retrieved at <<http://www.khronos.org/registry/cl/specs/opencl-1.1.pdf>>, Retrieved Date: Mar. 14, 2011, pp. 379.

Sandy, Matt, "CLI008 Data-Parallel Programming with DirectCompute," Nov. 2009, Retrieved at http://code.msdn.microsoft.com/directcomputehol/, pp. 21.

Papikapos, Matthew, "The PeakStream Platform: High-Productivity Software Development for Multi-Core Processors," Apr. 10, 2007, pp. 20.

\* cited by examiner

STREAM PROCESSING ON HETEROGENEOUS HARDWARE DEVICES

BACKGROUND

Modern computing ecosystems present users with a variety of hardware devices in their daily lives. For example, a typical user may interact with a desktop or notebook computer, a smartphone, a set-top box, etc. in a single day. Further, these devices are more frequently heterogeneous in that each device is likely to include a variety of different computational resources. For example, each device may include one or more central processing units (CPUs) (e.g., CPUs with single core or multi-core architectures) and graphics processing units (GPUs). It should be understood that under certain circumstances a GPU may be used to offload and accelerate 2D and/or 3D graphics rendering from the CPU to allow the CPU to focus on other primary processing operations. Additionally, an increasing number of hardware devices (e.g., mobile devices, tablet computers, etc.) are resource-constrained in terms of computational power and power consumption. Such constraints impose new challenges for optimizing the usage of the computational resources compared to traditional desktop computer environment Furthermore, stream processing applications are growing in popularity and functionality. Stream processing refers to a computing approach that employs a limited form of parallel processing and lends itself to digital signal processing and graphics processing applications (e.g., an FM radio receiver, a TV decoder, mobile image recognition applications, online games, and other image, video, and digital signal processing applications). Stream processing applications typically involve execution of advanced signal processing techniques with real-time constraints and offloading of the signal processing computations to various computational resources available in the operating device (e.g., to allocate/load-balance resources and/or accelerate computation).

However, developing such stream processing applications commonly implicates significant effort and calls for deep knowledge about a variety of specialized software development tools limited to specific computational resources made by individual hardware manufacturers. Furthermore, available development tools and run-time environments fail to provide automatic run-time parallelism of computational operations through thread and data parallelism or dynamic run-time selection of available computational resources in a heterogeneous hardware device. The foregoing issues contribute to the poor portability of stream processing applications, as they are typically designed for specific hardware. As such, developing stream processing applications for heterogeneous hardware devices remains a significant challenge, particularly existing software development tools and run-time environments.

SUMMARY

Implementations described and claimed herein address the foregoing problems by evaluating development-time performance characteristic estimates in combination with run-time parameters to schedule execution of stream processing software components in a stack of a stream processing application so as to satisfy a defined performance criterion in a heterogeneous hardware device. A stream processing application includes a stack of one or more interdependent stream processing software components (also called "stream processing blocks"). A stream processing execution engine evaluates within a run-time environment one or more performance characteristics of multiple computational resources in the heterogeneous hardware device. Each performance characteristic is associated with performance of a computational resource in executing a computational-resource-dependent instance of a stream processing software component. The stream processing execution engine schedules within the run-time environment a computational resource on which to execute a computational-resource-dependent instance of one of the stream processing software components. The scheduled computational-resource-dependent instance is targeted for execution on the computational resource that satisfies a performance policy attributed to the stream processing software component.

In some implementations, articles of manufacture are provided as computer program products. One implementation of a computer program product provides a tangible computer program storage medium readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
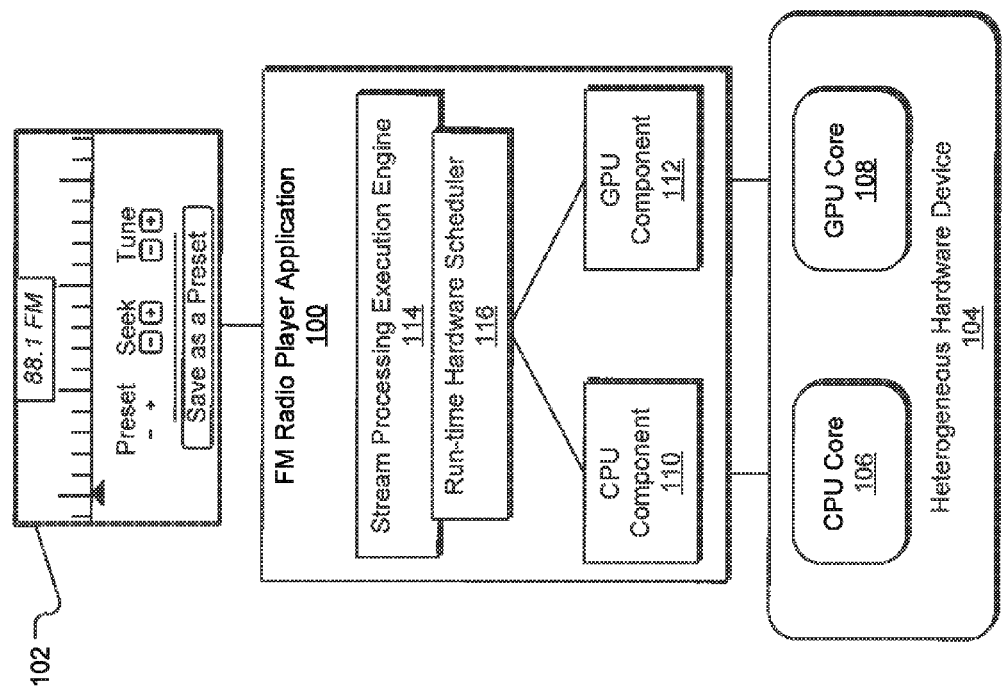
FIG. 1 illustrates an example stream processing application providing run-time computational resource scheduling.

FIG. 1 illustrates an example stream processing application (e.g., FM radio player application 100) providing run-time computational resource scheduling. An example user interface 102 of the FM radio player application 100 is shown, including a frequency display, a frequency dial, a present control, a seek control, a tune control, and a preset save control. In one implementation, the FM radio player application 100 may be executed in a heterogeneous hardware device 104, such as a desktop computer, laptop computer, set-top box, mobile device, etc., having multiple computational resources capable of executing one or more stream processing software components of the FM radio player application 100. The heterogeneous hardware device 104 illustrated in FIG. 1 includes a central processing unit (CPU) core 106 and a graphics processing unit (GPU) core 108, although other heterogeneous hardware devices may include different combinations of computational resources, including without limitation single-core and multi-core CPUs, GPUs, digital signal processors (DSPs), field-programmable gate arrays (FPGAs), vector units, etc.

In one implementation, a stream processing application, such as the FM radio player application 100, may be created to include a stack of the stream processing software components, logically coupled input-to-output, such that the output of one stream processing software component provides data as input to a subsequent stream processing software component. Each stack also includes at least one producer component (e.g., a component with one or more outputs but no inputs), which acts as a start of the stack, and at least one consumer component (e.g., a component with one or more inputs but no outputs), which acts as an end of the stack.

The stream processing software components represent elementary (or multi-operation) blocks of functionality that can be ordered in an interdependent sequence for execution in a computing system, such as the heterogeneous hardware device 104. Each stream processing software component may be reused in multiple, individual instances. Example stream processing software components include without limitation elementary components, such as cony( )—convolve vectors, xcorr( )—cross-correlate, fft( )—fast Fourier transform, sine( ) cosine( ) etc., and/or multi-operation components, such as data acquisition, FM demodulation, bandpass filtering, decimation, audio playing, etc. By defining a stack of stream processing software components, a developer can develop an operative core of a stream processing application, such as an FM radio player, video player, stream television application, etc.

Figure 2:
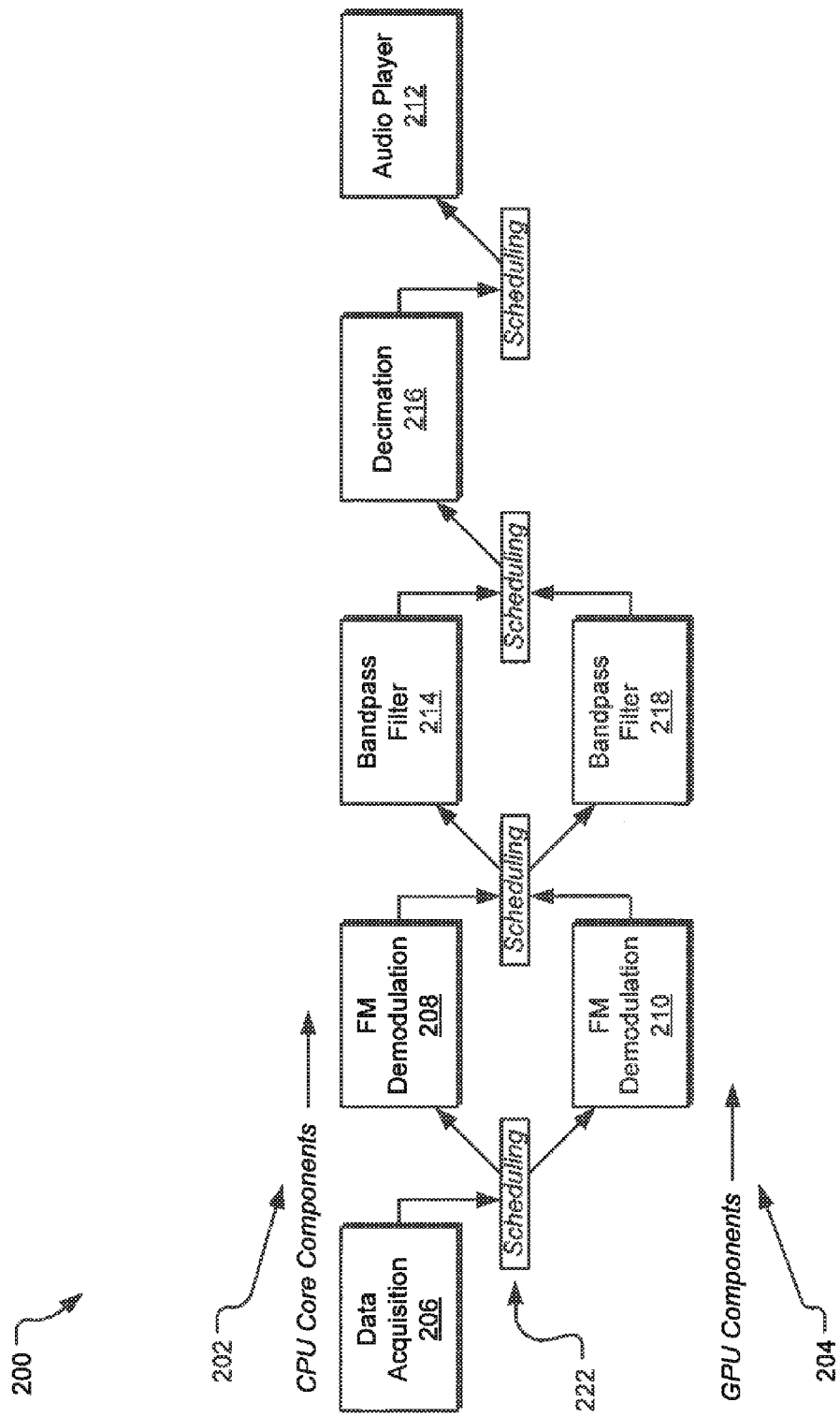
FIG. 2 illustrates an example radio stack corresponding to an FM radio player application employing stream processing on a heterogeneous hardware device.

The FM radio player application 100 in FIG. 1 shows only a CPU component 110 and a GPU component 112, although the FM radio player application 100 includes a plurality of stream processing software components in a stack (see e.g., FIG. 2). The CPU component 110 and the GPU component 112 represent individual components in a stream processing stack, and specifically components that provide similar functionality. For example, the CPU component 110 may represent a filtering component with basic x86 instructions targeted for the CPU core 106, while the GPU component 112 may represent a filtering component with High Level Shading Language (HLSL) instructions targeted for the GPU core 108. It should be understood that other filtering components may also be available, including x86 streaming SIMD extension (SSE) instructions, wherein SIMD refers to Single Instruction, Multiple Data, and instructions for other processing architectures, including without limitation DSPs and FPGAs.

The FM radio player application 100 executes in the context of a stream processing execution engine 114, which includes a run-time hardware scheduler 116. The stream processing execution engine 114 provides one or more of the following functions:

(1) mapping between a stack description of the stream processing application and the corresponding stream processing operations (e.g., stream processing software components) to be executed;
(2) configuring the execution environment of the stream processing software components within the heterogeneous hardware device, and particularly within the operating system running on the device;
(3) evaluating the computational resources to determine performance characteristics and run-time parameters (e.g., pertaining to execution time, current processing load, temperature, power consumption);
(4) scheduling at run-time each stream processing software component of a stack for a specific computational resource; and
(5) managing data parallelism support to dynamically offload computation defined by a stream processing software component to available computational resources.

The run-time hardware scheduler 116 is responsible for scheduling during run-time the execution of the loaded stream processing software components in the stack of the FM radio player application 100 on specific computational resources. In one implementation, the run-time assignment of a stream processing software component (e.g., the CPU component 110 and the GPU component 112) to a computational resource (e.g., CPU core 106 and GPU core 108, respectively) is performed by the run-time hardware scheduler 116 based on one or more policy definitions pertaining to performance characteristics of each stream processing software component and its corresponding computational resource. Policies can be defined to perform optimizations (e.g., to minimize power consumption, maximize data throughput, etc.). Based on its evaluation of the applicable policies, the next stream processing software component, and the available computational resources, the run-time hardware scheduler 116 schedules a computational-resource-dependent stream processing software component instance for execution in a thread servicing the FM radio player application 100.

Examples of policies may include an earliest estimated completion time policy, a lowest estimated power consumption policy, a fewest estimated cache miss count policy, a highest data throughput per unit time policy, a best balancing of estimated temperature policy, etc., and other policies may also be employed. In an implementation of an example earliest estimated completion time policy, the run-time hardware scheduler 116 determines which available hardware resource is estimated to complete the computation of a particular stream processing software component and schedules the stream processing software component for execution on that particular resource. In an implementation of an example lowest estimated power consumption policy, the run-time hardware scheduler 116 determines which available hardware resources is estimated to consume the least amount of power in executing a particular stream processing software component and schedules the stream processing software components for execution on that particular resource. In an implementation of an example fewest estimated cache miss count policy, the run-time hardware scheduler 116 determines which available hardware resource is estimated to result in the fewest cache misses during execution of a particular stream processing software component and schedules the stream processing software component for execution on that particular resource. Typically, this policy implies that the hardware resource executing the previously-executing stream processing software component is most likely to satisfy the fewest estimated cash discount policy.

In an implementation of an example highest data throughput per unit time policy, the run-time hardware scheduler 116 determines which combination of hardware resources is estimated to maximize data throughput of the entire stack and schedules the harbor resources accordingly. In an implementation of an example best balancing of estimated temperature policy, the run-time hardware scheduler 116 determines which combination of hardware resources is estimated to minimize the variation of operating temperature among available computation resources.

FIG. 2 illustrates an example radio stack 200 corresponding to an FM radio player application employing stream processing on a heterogeneous hardware device. A developer defines the stack 200 (e.g., by a stack description file) to include a series of CPU core components 202 and GPU components 204. Each component is specific to a computational resource or computational resource type. For example, the data acquisition component 206 may be written in basic x86 instructions to perform a data acquisition operation within the FM radio player application. However, in the illustrated stack, there is no alternative data acquisition component available for execution on the GPU (e.g., such a component may not have been developed yet, the GPU does not include processing capabilities sufficient for the task, etc.). In contrast, an FM demodulation component 208 for the CPU core and an FM demodulation operation 210 for the GPU are both available for a FM demodulation operation in the stack 200. At the start of the stack 200, the data acquisition component 206 is considered a producer, in that it has an output but no inputs. At the end of the stack 200, an audio player component 212 is considered a consumer, in that it has an input but no outputs. Other stream processing software components in the stack 200 include a bandpass filter component 214 and a decimation component 216 targeted to the CPU core and a bandpass filter component 218 targeted to the GPU.

During operation, the components in the stack 200 operate on data samples received from through the data acquisition component 206, which periodically produces a new buffer of FM signal data (e.g., every 16 milliseconds). The new buffer is input to the next stage of the stack 200, based on the scheduling of the next component. Depending on whether an instance of the CPU-targeted FM demodulation component 208 or GPU-targeted FM demodulation component 210 is scheduled to follow the CPU-targeted data acquisition component 206, the output buffer of the CPU-targeted data acquisition component 206 is loaded into the input buffer of the scheduled FM demodulation component 208 or 210, which then executes its instructions on the loaded data.

A scheduling operator 222 is a component of the stream processing execution engine. The scheduling operator 222 is represented as individual scheduling instances at different stages of the stack 200 in FIG. 2, although each instance will typically be implemented by a single hardware scheduling engine or scheduler. The scheduler operator 222 schedules each component in the stack 200 and assigns execution of the appropriate computational-resource-dependent stream processing software component instance on its targeted computational resource. Accordingly, the scheduling operator 222 schedules an instance of the CPU-targeted FM demodulation component 208 or an instance of the GPU-targeted FM demodulation component 210 to execute after the data acquisition operation, depending on which processing component (e.g., CPU or GPU) satisfies a performance policy (not shown in FIG. 2) set for the FM demodulation operation. At the next stage of the stack 200, a scheduling operator 222 schedules an instance of one of the bandpass filter components 214 and 218 for execution on the computational resource that satisfies a performance policy set for the bandpass filter operation. It should be understood that scheduling operators further schedule the execution of the CPU-targeted decimation component 216 and the CPU-targeted decimation component 212 as well, notwithstanding the fact that no corresponding GPU-targeted components are available in the example shown in FIG. 2.

Figure 3:
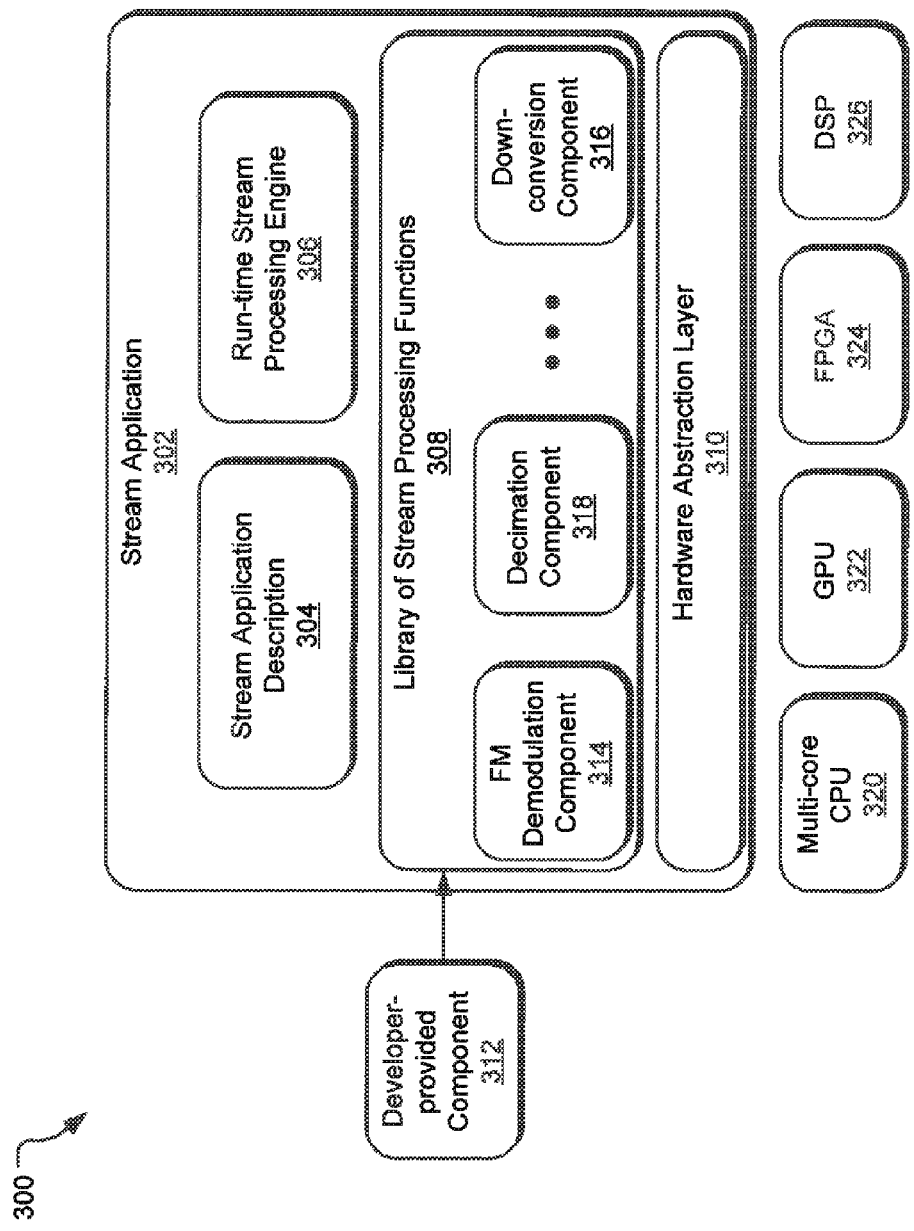
FIG. 3 illustrates an example software architecture for stream processing on heterogeneous hardware devices.

FIG. 3 illustrates an example software architecture 300 for stream processing on heterogeneous hardware devices. A developer can build a stream processing application 302 (e.g., an FM radio player application) based on a stream processing application description 304, a run-time stream processing engine 306, a library of stream processing functions 308, and a hardware abstraction layer interface 310.

The stream processing application description 304 defines the stream processing application 302 as a chain or stack of connected stream processing software components, each component having interfaces compatible with the interfaces of other components. For example, the output interface of one component is compatible to be connected to the input interface of another component to allow the first component to inject its output data as input data into the other component. The stream processing application description 304 also defines the dependencies among the components in the stream processing application's stack.

The library 308 includes a variety of stream processing software components targeted for one or more computational resources. For example, the library 308 may include an FM demodulation component 314 for multiple computational resources, such as a multi-core CPU 320, a GPU 322, an FPGA 324, and a DSP 326. In contrast, the library 308 may only include down-conversion components 316 for the multi-core CPU 320 and the GPU 322 and a decimation component 318 for the multi-core CPU 320. It should be understood, however, that the developer or other third-parties may provide components (such as developer-provided components 312) that can be inserted into the library 308 or otherwise added to the stream processing application 302.

The hardware abstraction layer interface 310 provides a common interface for components to interact with specialized computational resources. Stream processing software components can be written to the common interface of the hardware abstraction layer interface 310, which interacts with the specialized interfaces (e.g., registers, memory addresses, commands, thread synchronization, message queue, etc.) of the individually-supported computational resources. Each stream processing software component is compiled and linked with the hardware abstraction layer interface 310 to provide a computational-resource-dependent stream processing software component instance (e.g., an x86 instruction set for a CPU) that can be used in a stream processing stack. In one implementation, each component instance is provided in a dynamic link library (DLL), although other executable forms may be employed.

Figure 4:
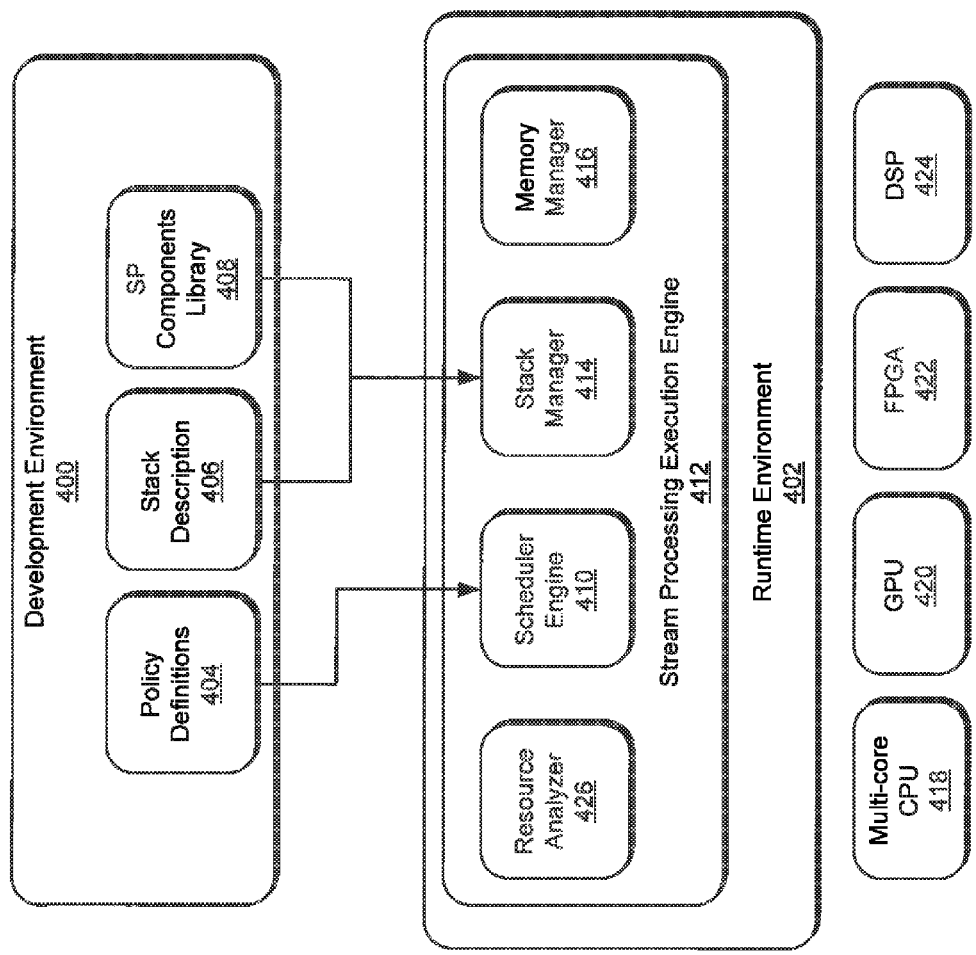
FIG. 4 illustrates example development and run-time environments for stream processing on heterogeneous hardware devices.

FIG. 4 illustrates an example development environment 400 and an example run-time environment 402 for stream processing on heterogeneous hardware devices. A developer provides policy definitions 404, a stack description 406 (or "stream processing application description"), along with a stream processing (SP) components library 408 within the development environment 400 to produce an executable stream processing application.

The policy definitions 404 define desired performance criteria for individual stream processing operations. The performance criteria may related to many different types of performance, including without limitation, data throughput, cache performance, operating temperature, power consumption, etc. For example, a policy definition 404 may specify a desired data throughput criterion (e.g., an amount of data that is desired to pass through the stack in a specified time duration). Within the run-time environment 402, a scheduler engine 410 can schedule, during run-time, the appropriate available computational resources on which to execute the individual stream processing software components in the stack to best achieve the throughput criterion.

The stack description 406 defines the stream processing application as a chain or stack of connected stream processing software components available in the library 408. The stack description 406 also defines the dependencies among the components in the stream processing application's stack. In one implementation, dependencies may be articulated in a dependency graph, although other methods of defining dependencies among components may be employed.

As described, a developer provides the policy definitions 404 and the stack description 406 in combination with a library 408 of stream processing software components to compile and link a stream processing application within the development environment 400. Thereafter, the stream processing application may be executed in a run-time environment 402, which includes a stream processing execution engine 412. In one implementation, the stream processing execution engine 412 is implemented as a Windows® service in a Windows® operating environment, although other implementations may be employed. The service is executed in a user-mode process running at the same priority or a higher priority than normal user-mode processes when it is running one or more stream processing stacks. This approach helps maintain real-time execution, but other approaches may also be used. The stream processing execution engine 412 supports dynamic (at run-time) deployment, removal, loading, unloading, and reconfiguration of stream processing software components of a stream processing stack.

The stream processing execution engine 412 includes a stack manager 414, which is responsible for a variety of operations. In one implementation, the stack manager 414 loads a file containing the stack description 406, parses the information about the stream processing software components specified for the stack, and creates a corresponding data-flow/dependency graph for the stream processing software components, describing the input data for each stage of the stack. At run-time, the stack manager 414 is also responsible for deployment/removal, loading/unloading, and reconfiguration of the current stack hosted by the stream processing execution engine 412.

When a stack described by a stack description 406 is loaded, the stack manager 414 coordinates with the scheduler engine 410 and the memory manager 416. The stack manager 414 loads and instantiates the DLL corresponding to each stream processing software component for each computational resource (e.g., using a Windows® LoadLibrary( ) API or other interface). The stack manager 414 exposes each component to the scheduler engine 410, which schedules them in a synchronous manner in an example implementation. The interface of a stream processing software component comprises an input buffer and/or output buffer, or multiples thereof, and may include intermediate buffers internal to the component. The input and output buffers are typically used for sharing data between serially connected components in the stack. The stack manager 414 requests that the memory manager 416 to allocate memory buffers accordingly.

The memory manager 416 can optimize memory allocation by pre-allocating some memory at the instantiation/initialization time and other memory during execution time, whenever it is possible. The memory manager 416 also provides control of the memory used by the stream processing execution engine 412.

The scheduler engine 410 schedules computational-resource-dependent instances of the stream processing software components and their assignment to their associated computational resource (e.g., a multi-core CPU 418, a GPU 420, an FPGA 422, or a DSP 424) in a manner that satisfies the criteria provided by the policy definitions 404. The scheduler engine 410 coordinates with a resource analyzer 426 to determine which computational resource is available for the next stream processing software component to be scheduled for the stack.

In one implementation, the scheduler engine 410 includes a set of worker queues (e.g., FIFOs) and one or more processing threads. In a multi-core device, the number of threads is typically equal to the number of CPU cores dedicated to stream processing. Thread affinity can be used to ensure that a thread is dedicated to a specific CPU core. Each thread can perform as both a consumer and a producer to a worker queue, extracting an instance of a stream processing software component from the work queue and executing the instance until completion. Upon completion of the component instance's execution, the scheduler engine 410 checks the dependency graph and schedules execution of the next possible component instance in the stack, which receives the output results of the previously executed component as its input. In some implementations, performance can be optimized by scheduling, in sequence, multiple component instances targeted to the same computational resource in order to take advantage of result data that is already stored in the resource's cache, but other scheduling schemes may also be employed.

The resource analyzer 426 detects and exposes the computational resources present in the heterogeneous hardware device. The resource analyzer 426 determines the computational resources available in the heterogeneous hardware device and the supported versions thereof (e.g., x86, x64, SSE, DirectCompute Shader 4.0 or 5.0, etc.). The resource analyzer 426 exposes each resource to the stack manager 414, the scheduler engine 410 and the memory manager 416 (e.g., so that the stack manager 414 only loads the DLLs for computational resources available in the heterogeneous hardware device). At run-time, the resource analyzer 426 also tracks the utilization of computational resources and provides this information to the scheduler engine (e.g., on a periodic basis).

Based on the type of computation (e.g., the operation and the size of input parameters) specified by a stream processing software component, the resource analyzer 426 assists the scheduler engine 410 in determining which computational resource is acceptable for offloading computation when more than one computation option exists. To this end, the resource analyzer 426 maintains a record of the estimated execution time of each previously executed stream processing software component to calibrate the performance characteristics of each computational resource for each component. The resource analyzer 426 communicates this performance characteristic information to the scheduler engine 410. The scheduler engine 410 uses this performance characteristic information to schedule an instance of a computational-resource-dependent stream processing software component instance on a targeted computational resources in accordance with the policy definitions 404.

Figure 5:
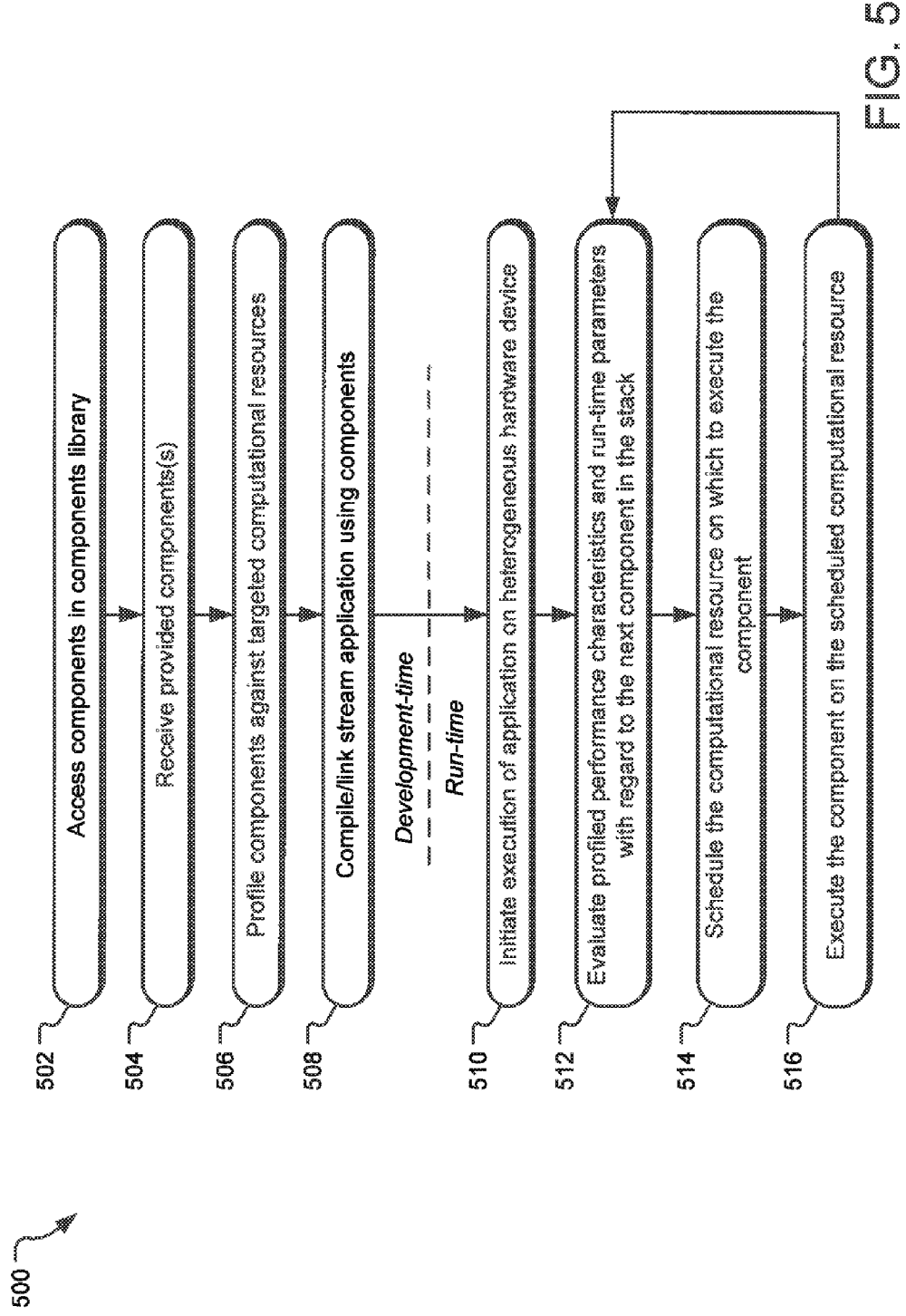
FIG. 5 illustrates example operations for developing and executing a stream processing application for a heterogeneous hardware device.

FIG. 5 illustrates example operations 500 for developing and executing a stream processing application for a heterogeneous hardware device. During development time, an access operation 502 accesses stream processing software components from a components library. Many components in the components library may be provided by the development environment vendor or a third-party. However, other components may be optionally contributed on an individual basis by a developer or other third-party component sources, as shown by a receiving operation 504.

In the illustrated implementation, the scheduling of individual instances of stream processing software components during run-time (see e.g., a scheduling operation 514) is informed by results of a profiling operation 506, which maintains a table of approximate execution durations for each stream processing software component for each supported computational resource. During development time, this profiling operation 506 executes the component instances of a stack one-by-one on each supported computational resource. For example, the execution duration for a component instance can be estimated by calling a Windows® API QueryPerformanceCounter( ) or a timing function in another operating system. In this manner, the duration of each operation on each computational resource may be determined within an acceptable level of precision (e.g., a few microseconds). Having estimated the duration of each component execution on each available computational resource in a heterogeneous hardware device, the profiling operation 506 fills the table of approximate execution durations for use during run-time by the scheduler engine of the stream processing stack execution engine.

A compile/link operation 508 compiles and links the stream processing software components defined in the stack description to yield the executable stream processing application for the targeted heterogeneous hardware device.

During run-time, an execution operation 510 initiates execution of the stream processing application on the targeted heterogeneous hardware device. An evaluation operation 512 evaluates the profiled information (e.g., estimated execution duration) about a computational resource's performance characteristics for a given component and one or more runtime parameters to inform the scheduling operation 514. In one implementation in which execution time is part of the policy definitions, the evaluation operation 512 estimates the time in which a current executing component would complete its execution and determines when a next component on each computational resource will complete its execution. For example, for each targeted computational resource, the evaluation operation 512 estimates the time the current component will complete execution. This completion time and the execution duration of the next component are summed for each targeted computational resource to provide an estimated completion time for each resource. The scheduling operation 514 then schedules the computational resource demonstrating the performance characteristic that satisfies the policy definitions for the component and the stack. An execution operation 516 executes the component on the scheduled computational resource.

It should be understood that although execution time is used in the above example, other performance characteristics may be considered, including power consumption, operating temperature, cache performance, etc. For example, an estimated power consumption for each component and computational resource combination may be determined during development time, and then the current operating power consumption of the resource may be used to adjust the estimated power consumption. In some implementations, current system load may also be considered to further inform the scheduling operation 514. In addition, other scheduling algorithms may be employed to optimize performance characteristics to satisfy the specified policies.

As a numerical example, consider a decimation component having a policy specifying fast execution of a stack in a stream processing application targeted to a heterogeneous hardware device having a dual-core CPU (CPU1 and CPU2) and a GPU. The example decimation component has an estimated execution time of 25 ms on a CPU core and 15 ms on a GPU. The evaluating operation 512 determines computational resources of the device demonstrate the following performance characteristics during run-time:

| Computational Resource | Estimated Completion Time for Current Component | Total Time to Completion of Next Component |
| --- | --- | --- |
| CPU1 | 50 ms | 50 + 25 = 75 ms |
| CPU2 | 5 ms | 5 + 25 = 30 ms |
| GPU | 20 ms | 20 + 15 = 35 ms |

Based on the performance table above, CPU2 is estimated (during runtime) to complete execution of the next component sooner than CPU1 or GPU. Accordingly, the scheduling operation 514 schedules the component to be executed on CPU2 when execution of the current component is completed on CPU2.

It is also possible to use pre-defined rules to determine the computational resource to be used to execute any particular component instance. For example, an example FPGA can typically provide more efficient execution than an example GPU to implement some specific functions that are not well supported in most GPU hardware, such as bit-wise operations (e.g., permutations, shifting operations). An example policy would consist of favoring execution on the FPGA if its current load permits it, rather than the GPU, for components that include such operations. In contrast, an example GPU typically integrates double-precision operations, while an example FPGA does not have native support for high-precision floating-point arithmetic. Accordingly, for components comprising high-precision operation results, a policy may specify favoring execution on the GPU, rather than the FPGA.

The described technology can also be advantageous in detecting and resolving under-runs and over-runs. If a data acquisition component instance for an example stream processing stack produces a new input buffer every 16 milliseconds while the processing of all other components require a total of 20 milliseconds to process one input buffer, the stream processing stack will be under-run and some samples will be lost. By contrast, in a heterogeneous hardware environment (e.g., a system having a dual core processor and a GPU), the resource analyzer 426 and the scheduler engine 410 can cooperate to avoid under-runs when the queue of the producer component reaches a maximum prescribed number of elements. For example, the scheduler engine 410 can detect that a queue becomes full at some point during execution and can request the resource analyzer 426 for an additional hardware resource (e.g., hardware acceleration). If the additional hardware resources are available, the scheduler engine 410 will adjust its scheduling accordingly to satisfy the output rate of the data acquisition component instance, thereby avoiding future under-runs. Alternatively, the scheduler engine 410 raises a flag to indicate possible data losses.

Similarly, the described technology, also detect and resolve over-runs. If the scheduler engine 410 detects that a particular queue never exceeds a threshold number of items in the queue (e.g., a threshold of 1), the scheduler engine for 10 may determine that too many hardware resources are allocated to the stream processing stack. Accordingly, the number of cores dedicated to the radio stack or the clock frequency of the cores may be reduced to save energy.

Figure 6:
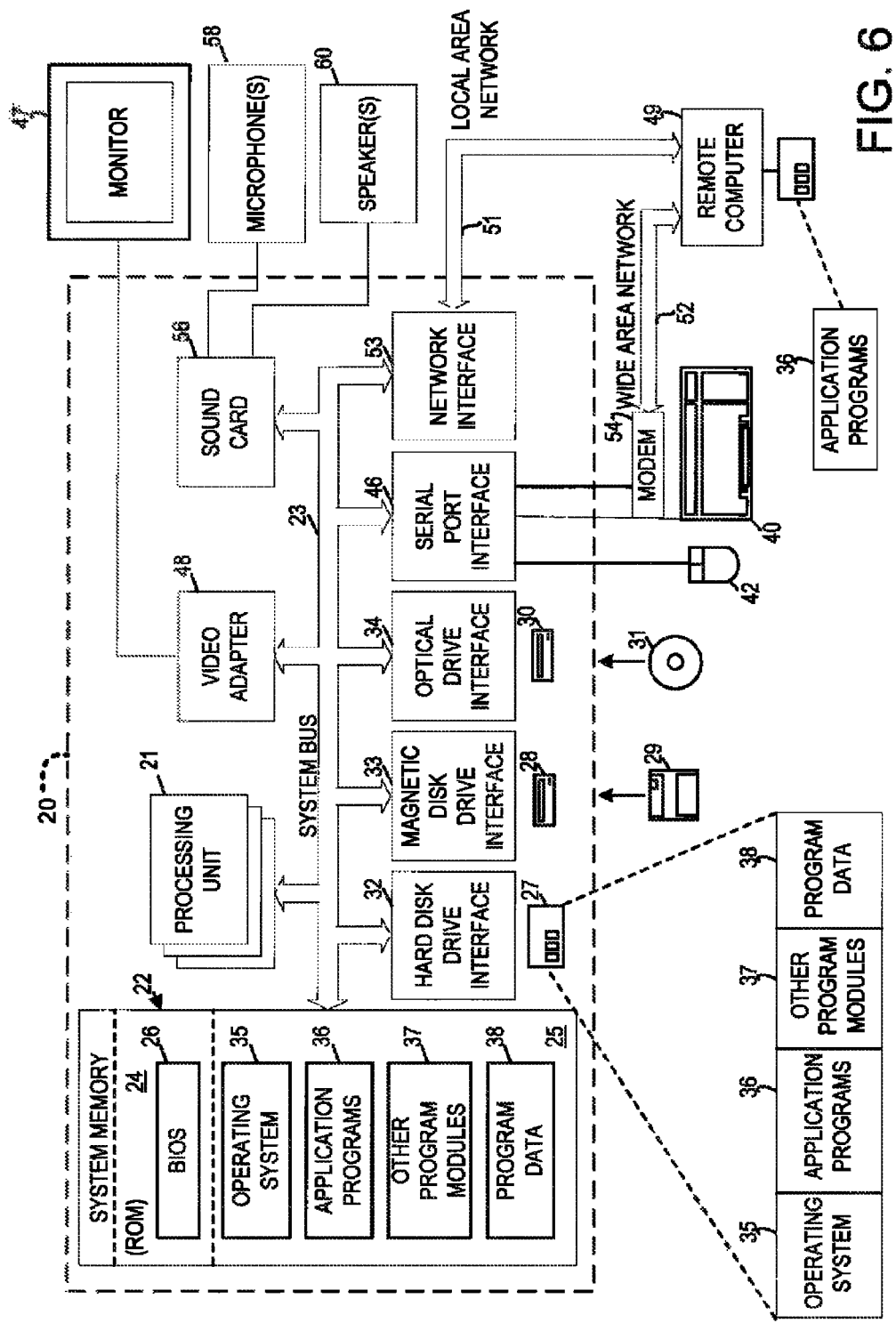
FIG. 6 illustrates an example system that may be useful in implementing the described technology.

FIG. 6 illustrates an example system that may be useful in implementing the described technology. The example hardware and operating environment of FIG. 6 for implementing the described technology includes a computing device, such as general purpose computing device in the form of a gaming console or computer 20, a mobile telephone, a personal data assistant (PDA), a set top box, or other type of computing device. In the implementation of FIG. 6, for example, the computer 20 includes one or more processing units 21 (e.g., a single- or multi-core CPU, a GPU, etc.), a system memory 22, and a system bus 23 that operatively couples various system components including the system memory to the processing units 21. It should be understood that there may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24, random access memory (RAM) 25, and any kind of flash memory, including solid-state drives. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, a DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone (see e.g., microphone(s) 58), joystick, game pad, satellite dish, scanner, or the like. For example, the microphone(s) 58 and speaker(s) 60 are connected to the system bus 23 via an interface, such as a sound card 56. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 60 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a stream processing application, a stream processing execution engine, a run-time hardware scheduler engine, an instance of a stream processing software component, a resource analyzer, a stack manager, a memory manager and other modules and services may be embodied by instructions stored in memory 22 and/or storage devices 29 or 31 and processed by the processing unit 21. Policy definitions, stack descriptions, input and output data, and other data may be stored in memory 22 and/or storage devices 29 or 31 as persistent datastores.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

Although the subject matter has been described in language specific to structure features and/or methodological acts, it is to be understood that the subject matter defined in the appended claims is not necessarily limited to the specific features or acts described above. Rather the specific features and acts described above are disclosed as example forms of implementing the claims.

The above specification, examples, and data provide a complete description of the structure and use of exemplary implementations of the described technology. Since many implementations can be made without departing from the spirit and scope of the described technology, the invention resides in the claims hereinafter appended. Furthermore, structural features of the different embodiments may be combined in yet another embodiment without departing from the recited claims.

What is claimed is:

1. A method comprising:
profiling each component of a plurality of stream processing components of a stream processing application on each available computational resource in a heterogeneous hardware device by executing component instances of a stack on each computational resource to determine one or more performance characteristics;
during execution of the stream processing application, evaluating within the run-time environment the determined one or more performance characteristics of the computational resources in the heterogeneous hardware device;
scheduling within the run-time environment a computational resource on which to execute a computational-resource-dependent instance of one of the stream processing software components based on the determined one or more performance characteristics that satisfy a performance policy attributed to the stream processing software component; and
executing in the run-time environment the selected computational-resource-dependent instance on the scheduled computational resource of the heterogeneous hardware device.

2. The method of claim 1 wherein the one or more interdependent stream processing software components are defined for the stack from a library of stream processing software components by a stack description identifying the interdependent stream processing software components and one or more dependencies among them.

3. The method of claim 1 wherein each stream processing software component includes at least one interface that is compatible with at least one interface of the other stream processing components in the stack.

4. The method of claim 1 wherein the performance policy specifies an execution time criterion, an earliest estimated completion of the computational-resource-dependent instance on the computational resources being deemed to satisfy the performance policy.

5. The method of claim 1 wherein the performance policy specifies a power consumption criterion, a lowest estimated power consumption of the computational-resource-dependent instance on the computational resources being deemed to satisfy the performance policy.

6. The method of claim 1 wherein the performance policy specifies a cache performance criterion, a fewest estimated cache miss count of the computational-resource-dependent instance on the computational resources being deemed to satisfy the performance policy.

7. The method of claim 1 wherein the performance policy specifies a data throughput criterion, a highest data throughput per unit time of the computational-resource-dependent instance on the computational resources being deemed to satisfy the performance policy.

8. The method of claim 1 wherein the performance policy specifies a thermal performance criterion, a balancing of estimated temperature over available computation resources by the computational-resource-dependent instance on the computational resources being deemed to satisfy the performance policy.

9. One or more physical and tangible computer-readable storage media storing processor-executable instructions for executing on a heterogeneous hardware device a computational-resource-implemented process comprising:
profiling each component of a plurality of stream processing components of a stream processing application on each available computational resource in the heterogeneous hardware device by executing component instances of a stack on each computational resource to determine one or more performance characteristics;
during execution of the stream processing application, evaluating within a run-time environment the determined one or more performance characteristics of the computational resources in the heterogeneous hardware device;
scheduling within the run-time environment a computational resource on which to execute a computational-resource-dependent instance of one of the stream processing software components based on the determined one or more performance characteristics that satisfy a performance policy attributed to the stream processing software component; and
executing in the run-time environment the selected computational-resource-dependent instance on the scheduled computational resource of the heterogeneous hardware device.

10. The one or more computer-readable storage media of claim 9 wherein the one or more interdependent stream processing software components are defined for the stack from a library of stream processing software components by a stack description identifying the interdependent stream processing software components and one or more dependencies among them.

11. The one or more computer-readable storage media of claim 9 wherein each stream processing software component includes at least one interface that is compatible with at least one interface of the other stream processing components in the stack.

12. The one or more computer-readable storage media of claim 9 wherein the performance policy specifies an execution time criterion, an earliest estimated completion of the computational-resource-dependent instance on the computational resources being deemed to satisfy the performance policy.

13. The one or more computer-readable storage media of claim 9 wherein the performance policy specifies a power consumption criterion, a lowest estimated power consumption of the computational-resource-dependent instance on the computational resources being deemed to satisfy the performance policy.

14. The one or more computer-readable storage media of claim 9 wherein the performance policy specifies a cache performance criterion, a fewest estimated cache miss count of the computational-resource-dependent instance on the computational resources being deemed to satisfy the performance policy.

15. The one or more computer-readable storage media of claim 9 wherein the performance policy specifies a data throughput criterion, a highest data throughput per unit time of the computational-resource-dependent instance on the computational resources being deemed to satisfy the performance policy.

16. The one or more computer-readable storage media of claim 9 wherein the performance policy specifies a thermal performance criterion, a balancing of estimated temperature over available computation resources by the computational-resource-dependent instance on the computational resources being deemed to satisfy the performance policy.

17. A method comprising:
- determining an execution duration for each component of a plurality of stream processing components on each available computational resource in a heterogeneous hardware device by executing component instances of a stack on each computational resource;
- compiling and linking the plurality of stream processing software components to yield an executable stream processing application for the heterogeneous hardware device;
- during execution of the stream processing application on the heterogeneous hardware device, for each computational resource, estimating an execution time for one of the plurality of stream processing software components based on the determined execution duration for the component; and
- scheduling a computational resource for the component based on the estimated execution time that satisfies a performance policy defined for the component.

18. The method of claim 17, further comprising executing the component on the scheduled computational resource.

19. The method of claim 17, wherein the performance policy specifies an execution time criterion.

20. The method of claim 17, wherein estimating the execution time comprises for each computational resource, determining when a current executing component will complete its execution and when a next component will complete its execution.

* * * * *